United States Patent

[11] 3,615,297

| [72] | Inventors | Roger M. Dille<br>Richmond, Va.;<br>Warren G. Schlinger, Pasadena; Joseph P. Tassoney, Whittier, Calif. |
|---|---|---|
| [21] | Appl. No. | 46,804 |
| [22] | Filed | June 16, 1970 |
| [45] | Patented | Oct. 26, 1971 |
| [73] | Assignee | Texaco Inc.<br>New York, N.Y. |

[54] CARBON RECOVERY PROCESS
7 Claims, No Drawings

[52] U.S. Cl. .................................................. 48/196 R,
23/209.6, 48/212, 48/215, 210/83, 23/209.9
[51] Int. Cl. .................................................. C10j 3/84,
C10k 1/00, C10k 1/08
[50] Field of Search .......................................... 48/196,
212, 213, 215; 23/209.4, 209.6; 210/42, 83

[56] References Cited
UNITED STATES PATENTS

| 2,980,521 | 4/1961 | Dille et al. ..................... | 48/196 |
| 2,980,522 | 4/1961 | Dille et al. ..................... | 48/196 |
| 2,982,635 | 5/1961 | Dille ............................. | 48/196 |
| 3,531,265 | 9/1970 | Dille ............................. | 48/215 X |

*Primary Examiner*—Morris O. Wolk
*Assistant Examiner*—R. E. Serwin
*Attorneys*—Thomas H. Whaley and Carl G. Reis ABSTRACT: A method for recovering oil-free particulate carbon from synthesis gas by washing said synthesis gas free from particulate carbon with water, preferably maintained at a pH in the range of about 7.5 to 10. A dispersion of particulate carbon in water is formed which is then contacted with bubbles of a gas selected from the group consisting of natural gas, methane, ethane, propane, butane, ethylene, propylene, synthesis gas and mixtures thereof. Clear water separates by gravity from the gas treated dispersion and a supernatant flowable slurry of particulate carbon in water having an increased concentration of oil-free particulate carbon is formed which may be recycled to the generator as fuel, or dewatered.

CARBON RECOVERY PROCESS

BACKGROUND OF THE INVENTION

1. Field of the Invention

This invention relates to a process for recovering oil-free particulate carbon from synthesis gas. This invention also relates to the production of water capable of reuse for cooling and scrubbing synthesis gas by removing finely divided carbon from said water.

2. Description of the Prior Art

Synthesis gas, mixture of carbon monoxide and hydrogen, is commonly made by the partial oxidation of liquid hydrocarbon fuels. Synthesis gas is important commercially as a source of hydrogen for use in hydrogenation reactions, and also as a source of feed gas for the synthesis of hydrocarbons, oxygen containing organic compounds, or ammonia.

The raw synthesis gas leaving a partial oxidation synthesis gas generator comprises principally CO and $H_2$ together with minor amounts of finely divided carbon or particulate carbon. The particulate carbon may be removed from the effluent gaseous stream by contacting the gas with water in a quenching and scrubbing zone. The finely divided carbon soot particles absorb water, forming a mixture of carbon and water. The carbon produced in synthesis gas manufacture is unique and problems associated with the separation of synthesis gas carbon are not the same as those encountered in the removal of carbons or solids by means of other processes. For example, the fine carbon particles are unusual in that typically particulate carbon produced by the partial-oxidation synthesis gas generation process will settle in water to only about 1.0 to 3.0 weight percent, whereas conventional carbon blacks may settle to concentrations of as much as 10 weight percent.

To produce synthesis gas economically, it is important to separate clear water from the carbon-water mixture for reuse. However, the fine particle size of the carbon soot makes ordinary filtration methods difficult and makes gravity separation uneconomical due to excessive settling times i.e. about 1–2 days. Further, liquid hydrocarbon extraction procedures for recovering particulate carbon soot are complex. In a prior process by R. M. Dille et al., U.S. Pat. No. 3,147,093, a hydrocarbon oil was added to the water-carbon mixture to facilitate separation, but this resulted in the formation of soft aggregates of carbon or carbon curds contaminated with oil. Further, under some conditions troublesome emulsions which are difficult to separate may form upon the addition of a gas to the oil-carbon dispersion. By the process of our invention, particulate carbon free from organic matter is quickly and easily separated from quench and scrubbing water, permitting recycle of the clear water.

SUMMARY

Particulate carbon is removed from synthesis gas produced in a free flow noncatalytic synthesis gas generator by contacting the hot synthesis gas with water and preferably alkaline water in the quench cooling and water scrubbing zone, thereby forming for example a particulate carbon-alkaline water dispersion containing about 0.5 to 4 weight percent of particulate carbon. In a gas-liquid contactor at a pressure in the range of about 1 to 250 atmospheres, the particulate carbon-alkaline water dispersion is then contacted with bubbles of a gas selected from the group consisting of natural gas, methane, ethane, propane, butane, ethylene, propylene, synthesis gas, and mixtures thereof. In a first embodiment of the invention, said gas is bubbled through the particulate carbon-alkaline water dispersion until an amount of gas about equivalent to the Oil Absorption Number of the particulate carbon, expressed as cubic centimeters as gas per gram of carbon, is absorbed by the particulate carbon. The gas treated dispersion is allowed to settle by gravity and within a relatively short time (about one half to 60 minutes) the phases separate and a clear water phase forms under a flowable slurry of oil-free particulate carbon in alkaline water. Alternately, the flow of the process may be made more continuous by employing a decanting vessel in which bubbles of gas rise steadily from the bottom, while simultaneously clean water is drawn off near the bottom of the vessel and recycled to the quench cooling and scrubbing zone while the supernatant thickened particulate carbon-water slurry is removed from the top of the vessel. The concentration of particulate carbon in the supernatant slurry is greater than that in the original dispersion, ranging from about 2 to 20 weight percent. Further, it was surprisingly found that the amount of particulate carbon in the slurry was inversely related to the size of the aforesaid gas bubbles, while the settling time was directly related to the bubble size.

In a second embodiment of the invention, the gas bubbles are formed in situ by first saturating the particulate carbon-alkaline water dispersion with the aforesaid gas under pressure, followed by flashing and bubble precipitation. Phase separation then takes place in a settling vessel in the manner like that described in the first case.

It is therefore a principal object of the present invention to improve the quality of the synthesis gas produced by the continuous partial oxidation of a hydrocarbon fuel by recovering substantially all of the finely divided carbon soot in the product gas as a fast separating slurry of oil-free ash-free particulate carbon and water.

Another object of the invention is to economically recover and recycle as a portion of the feed to a synthesis gas generator, substantially all of the free carbon soot entrained in the product gas stream from a synthesis gas generator.

Still another object of the invention is to easily recover fine carbon particles which are uncontaminated with oil or other organic matter from synthesis gas.

One further object of the invention is to recover particulate carbon from synthesis gas as a concentrated water slurry of particulate carbon in which the amount of water present is equal to an not in excess of the $H_2O$ requirements in the reaction zone of the gas generator, and which slurry may be recycled to said reaction zone as all or a portion of the feed.

DESCRIPTION OF THE INVENTION

Synthesis gas comprises principally $H_2$ and CO and may contain relatively small amounts of $CO_2$, $H_2O$, $CH_4$, $H_2S$, $N_a$, A, particulate carbon and fuel ash. It is made by the partial oxidation of a liquid hydrocarbon fuel in a free-flow synthesis gas generator. For example, a liquid hydrocarbon fuel such as fuel oil is reacted with an oxygen-rich gas and steam at an autogenously maintained temperature within the range of about 1700 to 3500° F. and a pressure in the range of 1 to 250 atmospheres.

The synthesis gas generator in our process preferably consists of a compact, unpacked, free-flow, noncatalytic, refractory lined steel pressure vessel of the type described in U.S. Pat. No. 2,809,104 issued to D. M. Strasser et al., which patent is incorporated herewith by reference.

The oxygen-rich gas may be selected from the group consisting of air, oxygen-enriched air (40 mole percent $O_2$ and higher), and preferably substantially pure oxygen (99.5 mole percent $O_2$ and higher).

Preheating of the reactants is optional; but generally desirable. For example, a hydrocarbon oil and steam may be preheated to a temperature in the range of about 100 to 700° F. and the oxygen may be preheated to a temperature in the range of about 100 to 750° F.

A wide variety of liquid hydrocarbon fuels are suitable as feedstocks for the partial oxidation process, including: various petroleum distillates and residue, naphtha, gas oil, residual fuel, reduced crude, fuel oil, whole crude, coal tar oil, shale oil and tar sand oil. Slurries of solid carbonaceous feedstocks which produce carbon soot upon combustion i.e., lignite, bituminous and anthracite coals in water or liquid hydrocarbons are also suitable and are included herewith as within the scope of the definition for liquid hydrocarbon fuels.

In a preferred embodiment of our invention the feed to the synthesis gas generator comprises a mixture of fuel oil and the particulate carbonaalkaline water slurry produced as a byproduct of this process. The water in said slurry is sufficient to replace the steam ordinarily used as part of the feed to the reaction zone. This provides a substantial economic benefit.

It is normal to produce from liquid hydrocarbon fuels by partial oxidation about 0.5 to 3 weight percent of free carbon soot (basis carbon in the liquid hydrocarbon fuel), since this conversion level is near the most economical level. The free carbon soot is produced in the reaction zone of the gas generator for example, by cracking liquid hydrocarbon fuels. Carbon soot will prevent damage to the refractory lining in the generator by scavenging the vanadium and nickel and other heavy metal constituents which are present as ash components in residuals oils. With heavy crude or fuel oils the operation is adjusted to leave about 2 to 3 weight percent of the carbon in the feed oil as free carbon soot in the product gas. With lighter distillate oils, progressively lower carbon soot yields are taken.

The amount of soot in the product synthesis gas may be controlled primarily by regulating the free oxygen to carbon ratio (O/C, atom/atom) in the range of 0.7 to 1.5 atoms of oxygen per atom of carbon in the fuel and to some extent by regulating the ratio of $H_2O$ to hydrocarbon fuel in the range of 0.15 to 3.0 pounds of $H_2O$ per pound of oil. At a constant oil feed rate, the entire operating range of about 1 percent to about 4 percent soot yield may be obtained by only a 6 percent change in the oxygen feed rate. $H_2O$ is principally introduced into the reaction zone to help control the reaction temperature, as a dispersant of the fuel fed to the reaction zone, and as a reactant to increase the relative amount of hydrogen produced.

The free carbon soot leaving the reaction zone entrained in the stream of product synthesis gas has some unique properties. It is both hydrophilic and oleophilic. It is easily dispersed in water and has a high surface area. For example, the specific surface area of the free carbon soot, as determined by nitrogen absorption, ranges from 100 to 1,200 square meters per gram. The Oil Absorption Number, which is a measurement of the amount of linseed oil required to wet a given weight of carbon soot, ranges from 1.5 to 5 cc's of oil per gram of carbon soot. For further information regarding the test method for determining the Oil Absorption Number see ASTM Method D-281.

Free carbon soot, also referred to herein as particulate carbon, as produced within our process has a particle size in the range of 0.01 to 0.5 microns and commonly has a diameter of about 77 millimicrons. Free carbon soot comprises about 92 to 94 weight percent of carbon and 3 to 5 weight percent of ash. Being formed at high temperatures, it is substantially free from volatile matter.

In one embodiment of our invention, the hot gaseous effluent from the reaction zone of the synthesis gas generator may be quickly cooled below the reaction temperature to a temperature in the range of 300 to 650° F. by direct quenching in water in a gas-liquid contacting or quenching zone. For example, the cooling water may be contained in a carbon-steel quench vessel or chamber located immediately downstream from the reaction zone of said gas generator. A large diameter dip leg starting at the bottom end of the reaction zone and discharging beneath the water level in the quench chamber serves as an interconnecting passage between the reaction zone and the quench zone through which the hot product gases pass. This passage also serves to substantially equalize the pressure in the two zones. A concentric draft tube, open on both ends, surrounds said dip leg, creating an annulus through which the mixture of gas and water rises vigorously and splashes against the support plate of the reactor floor. The water and gas then separate in the quench chamber in the space outside the draft tube. This circulation of water through the draft tube system maintains the entire quench system at essentially the temperature of the water leaving the quench vessel, which is also the temperature of the saturated steam in the quench zone.

Recycle water from the carbon recovery zone to be further described is normally introduced through a quench ring at the top of the dip-leg to cool the metal at that point. Large quantities of steam are generated in the quench vessel and the quench chamber may be likened to a high output, high pressure boiler.

The turbulent condition in the quench chamber, caused by the large volumes of gases bubbling up through said annulus space, helps the water to scrub substantially all of the solids from the effluent gas, forming a dispersion of unconverted particulate carbon and quench water. Further, additional steam required for any subsequent shift conversion step may be picked up by the effluent synthesis gas during quenching. For a detailed description of the quench chamber, reference is made to U.S. Pat. No. 2,896,927, issued to R. E. Nagle et al., which is herewith incorporated by reference. Any residual solids in the cooled and scrubbed effluent synthesis gas leaving the quench chamber may be removed by means of a conventional venturi or jet scrubber, such as described in Perry's Chemical Engineers' Handbook, Four Edition, McGraw-Hill Co., 1963, pages 18–55 to 56.

Alternately, the hot effluent gas stream form the reaction zone of the synthesis gas generator may be partially cooled to a temperature in the range of about 300 to 650° F. by indirect heat exchange in a waste heat boiler. The entrained solid particles may be then scrubbed from the effluent synthesis gas by contacting and further cooling the effluent stream of synthesis gas with quench water in a gas-liquid contact apparatus, for example, a spray tower, venturi or jet scrubber, bubble plate contactor, packed column, or in a combination of said equipment. For a detailed description of cooling synthesis gas by means of a waste heat boiler and a scrubbing tower, reference is made to U.S. Pat. No. 2,980,523, issued to R. M. Dille et al.

It is desirable to maintain the concentration of particulate carbon in the gas cooling and scrubbing waters below about 1 weight percent. In this manner, the dispersion of carbon in water will be maintained sufficiently fluid for easy pumping through pipelines and for further processing. For example, low viscosities will also facilitate the next step in the process wherein the particulate carbon-alkaline water dispersion is contacted with gas bubbles to facilitate rapid separation of clear water from the dispersion.

It is important with respect to the economics of the process that the particulate carbon be removed from the cooling and scrubbing water to permit the resulting clear water to be recycled and reused for cooling and scrubbing additional synthesis gas. Supplemental anhydrous ammonia or caustic soda may be added to the water being recycled to maintain the system at a preferred pH about 7. Other suitable alkalies may also be used. There are at least two advantages for maintaining the system alkaline: first, it was surprisingly found that the concentration of particulate carbon in the slurry may be greatly increased thereby; and second, an alkaline system reduces corrosion, permitting the use of standard carbon-steel piping, valves, heat exchanges, and tanks at a considerable savings.

The particulate carbon-alkaline water dispersion from the quench vessel of the synthesis gas generator and from the wash and scrubbing units at a temperature in the range of about 300 to 650° F. are further cooled in a conventional non-contact heat exchanger to a temperature in the range of about 100 to 250° F. and preferably in the range of about 100 to 150° F. The carbon-water dispersion is then contacted with a gaseous hydrocarbon containing from 1 to 4 carbon atoms including methane, ethane, propane, butane, ethylene, propylene, and mixtures thereof. Further, in a preferred embodiment of our invention, low cost natural gas gave excellent results. Still further, synthesis gas from the process, preferably containing a minimum of 0.1 mole percent of methane and with the entrained particulate carbon removed may also be used. However, unsatisfactory results were obtained when either air, nitrogen, or carbon dioxide was used as the contacting gas. Thus, suitable contacting gases in our process include the aforesaid gaseous hydrocarbons and gas mixtures containing said gaseous hydrocarbons which have a particular affinity for the particulate carbon, replacing absorbed water thereon.

To contact the dispersion with one of the aforesaid preferred gases, in one embodiment of our process the particulate carbon-alkaline water dispersion is contained in a closed vessel provided with means for removing the underflow and overflow as for example a conventional vertical decanter. The temperature of the dispersion in the decanter may be in the range of 100 to 250° F. and preferably in the range of 100 to 150° F. The pressure of the dispersion is in the range of 1 to 250 atmospheres, and preferably about 50 to 100 p.s.i.g. below the gas pressure. The gas at a preferred temperature in the range of about 70 to 200° F. is then dispersed in the particulate carbon-alkaline water dispersion in the form of bubbles of desired size. When the gas is synthesis gas from the process, compression costs are saved because it may already be at superatmospheric pressure.

The gas may be introduced into the dispersion by way of a perforated plate sparger, screen, or porous septa at the bottom of the retention vessel at a rate in the range of about 1 to 20 cubic feet per square foot of tank cross section per minute, preferably to produce vigorous complete agitation. For good performance the whole sparger surface should bubble more or less uniformly and be free from serious coalescence at the surface of the septum which causes poor dispersion of the gas in the liquid.

The size of the gas bubbles is a direction function of the size of the pores in the septum and the pressure drop imposed across it. Porous media are manufactured from carbon, silica, alumina, glass, silicon carbide and a number of metals including monel, inconel, and stainless steel. Suitable average pore diameters range from 0.01 to 0.72 mm. (millimeters) and suitable differential pressures in inches of water (total pressure minus head of liquid above diffuser center line) may range from 2 to 40. The size of the gas bubbles are preferably in the range of about 0.01 to 0.15 mm.

The particulate carbon-water dispersion may be treated with gas bubbles and then introduced into a separate settling vessel where the supernatant particulate carbon-water slurry separates. Or, stepwise in the same vessel the dispersion may be first treated with gas bubbles and then allowed to settle. Alternately, the flow of the process may be made more continuous by employing a decanting vessel in which bubbles of gas rise steadily from the bottom, while simultaneously clean water is drawn off near the bottom of the vessel and recycled to the quench cooling and scrubbing zone while the supernatant thickened particulate carbon-water slurry is removed from the top of the vessel.

Surprisingly, the concentration of particulate carbon in the particulate carbon-alkali water slurry that forms in settling vessel is inversely related to the diameter of the gas bubble; whereas, the settling time i.e. the time required to completely separate clear water from the particulate carbon-alkali water dispersion is directly related to the bubble size. Generally, the settling time is about the same as the bubbling time. For example, it may be demonstrated that when 35 s.c.f.h. (standard cubic feet per hour) of natural gas were bubbled through 5,000 milliliters of a water dispersion of 0.5 weight percent of particulate carbon having an Oil Absorption number of 2.8 cubic centimeter per gram contained in a vessel 14.4 cm. I.D. × 45 cm. high for a period in the range of about 15 –30 minutes, settling times were reduced 50 percent and concentrations of particulate carbon in the slurry were increased over 150 percent by decreasing the gas bubble size formed by passage of the gas through an ASTM 325 screen (44 microns) to a gas bubble size formed by passage of the gas through a diffuser stone (10 microns). Further, it was unexpectedly found that by increasing the pH of the dispersion from a value in the acidic range of 7 or below to a value in the alkaline range of above 7, i.e. 9.5 the concentration of the particulate carbon in the supernatant slurry was increased from about 2.3 to about 20 weight percent, while the settling time remained about the same. Thus, although the process is operable with neutral and acidic waters having a pH of less than 7, unexpectedly greater concentrations of particulate carbon in the sludge are achieved by increasing the alkalinity of the dispersion to a pH greater than 7. A preferred pH for the dispersion is in the range of about 7.5 to 10.

While the exact mechanism is unknown, it is postulated that the methane containing gas is absorbed into the pores of the carbon particles, replacing the water on on the surface of the carbon and floating the particles to the surface of the water. Further, the small carbon particles are prevented from acting as a gelling agent so that a flowable slurry with a greater concentration of carbon is produced. By utilizing a myriad of small bubbles, the absorption of the gas in the water and the effective contact between the gas and the particulate carbon are greatly increased.

As described previously, vanadium iron and nickel constituents and other ash products produced during combustion of residual fuel oil are carried out of the synthesis gas generator by combining with the particulate carbon entrained in the synthesis gas. Advantageously, by means of our process these materials may now be readily separated from each other by gravity, For example, the fuel ash drops to the bottom of a settling vessel where it may be easily removed from the system and set to a metals recovery zone while the ash-free particulate carbon floats to the top, forming a concentrated oil-free particulate carbon-water slurry.

The particulate carbon is contacted with gas bubbles until all of the water is displaced from the pores of the carbon and the particulate carbon is saturated. Preferably, the bubbling is continued until an amount of gas about equivalent to the Oil Absorption Number of the particulate carbon, expressed as cubic centimeters of gas per gram of carbon, is absorbed by the particulate carbon. Gas from off the top of the decanter may be mixed with fresh makeup gas and pumped back into the decanter by way of the sparger. Insufficient gas blowing will decrease the concentration of carbon in the slurry which floats on the clear separated water. Reblowing will compact the separated carbon-water slurry to a higher carbon loading. At one atmosphere, a suitable time for keeping the gas in contact with the dispersion may vary in the range of from about 5 to 60 minutes. As the pressure in the vessel is increased the contact time may be decreased. Settling time is about the same as the blow time. It was surprisingly found that the size of the gas bubbles has a direct effect on separating time and the concentration of particulate carbon in the dispersion. The larger the gas bubbles, e.g. 1½ mm., 2¼ mm., five thirty-seconds of an inch, the lesser the amount of particulate carbon which is separated from the water in a given time. Also, a longer time for complete separation are required with larger bubbles.

During settling, clear water quickly separates from the gas blown dispersion. The particulate carbon-water slurry which forms with an increased concentration of particulate carbon has a specific gravity of less than 1 and comprises about 3 to 20 weight percent of particulate carbon.

The clear water may be continuously drawn off from the bottom of the decanter and particulate carbon-water slurry may be continuously drawn off at the top. An interface is maintained in the vessel so that the incoming feed may be preferably forced to filter through the top layer of particulate carbon-alkaline water slurry. By this means the slurry layer serves as a filter which effectively removes particulate carbon from the influent. The clear water underflow may be recycled to the quench tank or carbon scrubbing tower as make up water. The particulate carbon-water slurry overflow may be continuously removed from the decanter as a flowable slurry. A portion of the slurry may be further reduced in water content by well known methods, such as centrifuge to produce clean particulate carbon free from oil or other organic contaminants and suitable for use as a pigment or filler in applications where freedom from oil contamination is essential. Alternately, the slurry may be used as feed to the synthesis gas generator or as boiler feed, either alone or in combination with some other carbonaceous fuel. Advantageously, by keeping the concentration of water in the slurry recycled to the generator in the range of about 80 to 97 weight percent, all of the $H_2O$ requirements in the reaction zone may be satisfied.

The second embodiment of our invention like the first embodiment utilizes the impinging effect and buoyant power of gas bubbles to contact particulate carbon in the dispersion thereby floating it to the surface and resolving the dispersion. The gas bubbles in the second embodiment are formed in situ by first saturating the particulate carbon-alkaline water dispersion with one of the contacting gases listed in the first case at a pressure in the range of 1 to 250 atmospheres followed by a reduction in pressure in the order of about 50 to 20 p.s.i.g., flashing and bubble precipitation. All other features are substantially the same as in the first embodiment. This procedure is described more fully by means of the following example.

408 lbs. per hr. (pounds per hour) of fuel oil having an API gravity of 9.0, a gross heating value of 18,273 B.t.u. per pound and an ultimate analysis in weight percent of C=87.67, $H_a$=10.00, S=1.27, $N_2$=0.90 and ash=0.06, are mixed with a recycle stream of particulate carbon-alkaline water slurry comprising 88.8 lbs. per hr. of water and 10.62 lbs. per hr. of particulate carbon to comprise a fuel mixture. At a temperature of 239° F., the aforesaid fuel mixture is introduced into a conventional free flow, noncatalytic, synthesis gas generator as previously described along with 5039 s.c.f.h. (standard cubic feet per hour) of 99.5 moles percent oxygen. Reaction takes place in the synthesis gas generator at a temperature of about 2068° F. and at a pressure in the range of about 77 atmospheres.

The raw effluent gas from the synthesis gas generator comprises in volume percent, on a dry basis, $H_2$=43.72; CO=51.48; $CO_2$=3.47; $CH_4$=0.62; $N_2$=0.27 A=0.09; $H_2$=0.18 and contains 10.62 lbs. per hr. of unconverted entrained particulate carbon. The entrained carbon has an Oil Absorption Number of 3.9 cc. per gr. (cubic centimeters per gram). About 20,000 s.c.f.h. of hot effluent gas from the reaction zone are cooled to a temperature of about 485° F. by direct quenching in water in the quench section of the synthesis gas generator. About 6063 lbs. per hr. of water maintained at a pH of about 8.0 by the addition of about 3.0 lbs. per hr. of anhydrous ammonia are introduced into the quench tank for cooling the effluent gas. A particulate carbon-alkaline water dispersion at a temperature of 454° F. comprising 5668 lbs. per hour of particulate carbon is removed from the bottom of the quench tank, cooled to a temperature of 100° F., and introduced into a vessel where it is saturated with about 690 s.c.f.h. of natural gas at a temperature of 100° F. and a pressure of 3.8 atmospheres. The natural gas may be introduced into the dispersion by way of a sparger at the bottom of the vessel. About 46 s.c.f.h. of natural gas makeup are added to the system to compensate for that absorbed by the particulate carbon. The dispersion is treated with natural gas until an amount of gas about equivalent to the Oil Absorption Number, expressed as cc. of gas per gram of carbon, is absorbed by the carbon. Alternately, the gas may be dispersed in the liquid dispersion by fluid-attrition systems such as nozzles and pipeline contactors.

The gas treated dispersion is passed through a back pressure valve and introduced into a conventional settling vessel below the liquid level at a pressure of about 1.5 atmospheres. Sudden release of the pressure produces a myriad of fine well particulate bubbles of the particulate size, as previously discussed in the first embodiment. Resolution having the dispersion is quickly effected with clear water falling to the bottom of carbon-water vessel and a slurry of particulate carbon alkaline water of increased concentration of particulate carbon, (about 10 weight percent of particulate carbon) floats on top of the water. The particulate carbon-alkaline water slurry is continuously drawn off from the settling vessel as overflow and is recycled to the synthesis gas generator as a portion of the feed, as previously described. About 56 lbs. per hr. of water with coarse heavy metal fuel ash settle to the bottom of the vessel and are continuously removed from the system. About 644 s.c.f.h. of natural gas are removed from the top of the settling vessel, mixed with the aforesaid makeup natural gas, and introduced into the particulate carbon-alkaline water dispersion, as previously described. About 540 lbs. per hr. of makeup water are added to the system to compensate for $H_2O$ converted into $H_2$ and $CO_2$ and the $H_aO$ carried out of the system with the effluent product gas.

The process of the invention has been described generally and by examples with reference to liquid hydrocarbon feedstocks, effluent synthesis gas streams, and various other materials of particular compositions for purposes of clarity and illustration only. From the foregoing it will be apparent to those skilled in the art that the various modifications of the process and the materials disclosed herein can be made without departure from the spirit of the invention.

We claim:

1. A method for recovering oil-free particulate carbon as a flowable mixture with water from an effluent stream of synthesis gas comprising principally carbon monoxide and hydrogen and containing a minor amount of entrained particulate carbon and fuel ash resulting from the reaction of a liquid hydrocarbon fuel with oxygen at a pressure in the range of about 1 to 250 atmospheres, said particulate carbon having an Oil Absorption Number within the range of about 1.5 to 5 cubic centimeters of oil per gram of carbon which method comprises cooling said synthesis gas stream to a temperature in the range of about 100 to 650° F. and contacting said gas stream with water in a gas-liquid contacting zone to effect separation and removal of said particulate carbon and fuel ash from said effluent gas stream and to form a particulate carbon-water dispersion; contacting said particulate carbon-water dispersion with bubbles of a contacting gas selected from the group consisting of natural gas, methane, ethane, propane, butane, propylene, ethylene, synthesis gas, and mixtures thereof at a pressure in the range of about 1 to 250 atmospheres until an amount of said gas about equivalent to the Oil Absorption Number of said entrained particulate carbon expressed as cubic centimeters of gas per gram of carbon is absorbed by said particulate carbon to effect an increase in concentration of particulate carbon in said particulate carbon-water dispersion forming a supernatant oil-free particulate carbon-water slurry having an apparent carbon-water dispersion into clarified water, fuel ash and said oil-free particulate carbon-water slurry; and separating by gravity said clarified water and fuel ash from said oil-free particulate carbon-water slurry.

2. The process of claim 1 wherein said particulate carbon-water dispersion is maintained at a pH in the range of about 7.5 to 10 and the weight percent of oil-free particulate carbon in said oil-free particulate carbon-water slurry is in the range of about 3 to 20 weight percent.

3. The process of claim 1 wherein said particulate carbon-water dispersion is contacted with bubbles of gas in a continuous decanting zone wherein simultaneously said treating gas is introduced through a porous septa at the bottom of said decanter, said clarified water is removed near the bottom of said decanter, and said supernatant oil-free particulate carbon-water slurry is removed near the top of said decanter.

4. The process of claim 1 wherein said particulate carbon-water dispersion is treated with a portion of the effluent synthesis gas product is substantially the same pressure as said synthesis gas is generated.

5. A method for recovering oil-free particulate carbon from an effluent stream of synthesis gas comprising carbon monoxide, hydrogen and entrained particulate carbon resulting from the reaction of a liquid carbon fuel with oxygen in the reaction zone of a free flow partial oxidation synthesis gas generator at a temperature in the range of 1700 to 3500° F. and a pressure in the range of 1 to 250 atmospheres, said particulate carbon having an Oil Absorption Number within the range of about 1.5 to 5 cubic centimeters of oil per gram of carbon which method comprises contacting said synthesis gas stream with alkaline water in a gas-liquid contacting zone to cool said gas stream to a temperature in the range of 300 to 650° F. and to effect the removal of particulate carbon entrained therein from said synthesis gas stream and to form a particulate carbon-alkaline water dispersion comprising from about 0.5 to 5 weight percent of particulate carbon; cooling said particulate carbon-alkaline water dispersion to a temperature in the range of about 100 to 250° F.; contacting said cooled particulate carbon-alkaline water dispersion in a gas-liquid contacting zone with natural gas at a pressure in the range of about 1 to 250 atmospheres until an amount of said gas about equivalent to the Oil Absorption Number of said entrained particulate carbon expressed as cubic centimeters of gas per gram of carbon is absorbed by the said particulate carbon; introducing said gas treated dispersion into a settling zone below the liquid level at a reduced pressure producing a myriad of fine bubbles of natural gas within said cooled particulate carbon-alkaline water dispersion and increasing the concentration of particulate carbon in said dispersion and forming an oil-free particulate carbon-alkaline water slurry having an apparent density less than said alkaline water thereby effecting resolution of said dispersion into clarified alkaline water and said oil-free particulate carbon-alkaline water slurry; and separating said clarified alkaline water from said oil-free particulate carbon-alkaline water slurry.

6. The process of claim 5 wherein said alkaline water is maintained at a pH in the range of about 7.5 10.

7. The process of claim 6 wherein said oil-free particulate carbon-alkaline water slurry comprises in weight percent about 3 to 20 of oil-free particulate carbon and about 80 to 97 of alkaline water, and said slurry is recycled to the reaction zone of said synthesis gas generator as all or portion of the feed.

PO-1050
(5/69)

UNITED STATES PATENT OFFICE
CERTIFICATE OF CORRECTION

Patent No. 3,615,297                              Dated October 26, 1971

Inventor(s) ROGER M. DILLE, WARREN G. SCHLINGER and JOSEPH P. TASSONEY

It is certified that error appears in the above-identified patent and that said Letters Patent are hereby corrected as shown below:

| | |
|---|---|
| Col. 1, line 11 | Before "mixture" insert --a-- |
| Col. 2, line 44 | Change "$N_a$" to --$N_2$-- |
| Col 4, line 22 | Change "form" to --from-- |
| Col. 5, line 27 | Change "direction" to --direct-- |
| Col. 5, line 51 | Before "settling" insert --the-- |
| Col. 6, line 25 | Change "set" to --sent-- |
| Col. 7, line 20 | Change "$H_a$" to --$H_2$-- |
| Col. 7, line 35 | Change "$H_2=0.18$" to --$H_2S=0.18$-- |
| Col. 7, lines 65 & 66 | Change "particulate" to --dispersed-- |
| Col. 7, line 66 | Change "particulate" to --desired-- |
| Col. 7, line 67 | Change "having" to --of |
| Col. 8, line 46 Claim 1 | After "apparent" insert --density less than water and effecting resolution of said particulate-- |
| Col. 8, line 64 Claim 4 | Change "is" to --at-- |

Signed and sealed this 18th day of July 1972.

(SEAL)
Attest:

EDWARD M. FLETCHER, JR.        ROBERT GOTTSCHALK
Attesting Officer              Commissioner of Patents